(12) United States Patent  (10) Patent No.: US 7,711,809 B2
Kuan et al.  (45) Date of Patent: May 4, 2010

(54) DETECTING AN UNAUTHORIZED STATION IN A WIRELESS LOCAL AREA NETWORK

(75) Inventors: Chia-Chee Kuan, Los Altos, CA (US); Miles Wu, Fremont, CA (US); Dean Au, Sunnyvale, CA (US)

(73) Assignee: Airmagnet, Inc., Sunnyvale, CA (US)

( * ) Notice: Subject to any disclaimer, the term of this patent is extended or adjusted under 35 U.S.C. 154(b) by 939 days.

(21) Appl. No.: 10/116,473

(22) Filed: Apr. 4, 2002

(65) Prior Publication Data

US 2003/0221006 A1 Nov. 27, 2003

(51) Int. Cl.
*G06F 15/173* (2006.01)
(52) U.S. Cl. ................ 709/224; 709/238; 709/229; 370/252
(58) Field of Classification Search ......... 709/223–224, 709/217–219, 228–230, 249–250, 238; 713/201; 370/245, 252; 455/410
See application file for complete search history.

(56) References Cited

U.S. PATENT DOCUMENTS

| 5,978,669 | A | * | 11/1999 | Sanmugam | 455/410 |
| 5,978,919 | A | | 11/1999 | Doi et al. | |
| 5,982,762 | A | | 11/1999 | Anzai et al. | |
| 6,345,043 | B1 | | 2/2002 | Hsu | |
| 6,674,738 | B1 | * | 1/2004 | Yildiz et al. | 370/338 |
| 6,693,888 | B2 | * | 2/2004 | Cafarelli et al. | 370/338 |
| 2001/0048744 | A1 | * | 12/2001 | Kimura | 455/411 |
| 2002/0022483 | A1 | * | 2/2002 | Thompson et al. | 455/439 |
| 2003/0037169 | A1 | * | 2/2003 | Kitchin | 709/249 |
| 2003/0135762 | A1 | * | 7/2003 | Macaulay | 713/201 |
| 2003/0142641 | A1 | * | 7/2003 | Sumner et al. | 370/328 |
| 2003/0149891 | A1 | * | 8/2003 | Thomsen | 713/201 |
| 2003/1016126 | | * | 8/2003 | Cao et al. | 370/229 |
| 2003/0186679 | A1 | * | 10/2003 | Challener et al. | 455/410 |
| 2003/0188190 | A1 | * | 10/2003 | Aaron et al. | 713/201 |

FOREIGN PATENT DOCUMENTS

JP 2001-345819 12/2001

OTHER PUBLICATIONS

PCT International Search Report for PCT Application No. PCT/US03/09682 mailed Jul. 2, 2003 (7 pages).
PCT Notification of Transmittal of International Preliminary Examination Report for PCT/US03/09682, mailed Jul. 21, 2004, 4 pages.

* cited by examiner

*Primary Examiner*—Philip B Tran
(74) *Attorney, Agent, or Firm*—Blakely, Sokoloff, Taylor & Zafman LLP

(57) ABSTRACT

In a wireless local area network a probe request frame is transmitted over the wireless local area network by a station. The probe request frame is received at a detector in the wireless local area network. The received probe request frame is analyzed to determine if the station that transmitted the probe request frame is an unauthorized station.

22 Claims, 6 Drawing Sheets

DETECTING AN UNAUTHORIZED STATION IN A WIRELESS LOCAL AREA NETWORK

BACKGROUND

1. Field of the Invention

The present invention generally relates to wireless local area networks. More particularly, the present invention relates to detecting an unauthorized station in a wireless local area network.

2. Description of the Related Art

Computers have traditionally communicated with each other through wired local area networks ("LANs"). However, with the increased demand for mobile computers such as laptops, personal digital assistants, and the like, wireless local area networks ("WLANs") have developed as a way for computers to communicate with each other through transmissions over a wireless medium using radio signals, infrared signals, and the like.

In order to promote interoperability of WLANs with each other and with wired LANs, the IEEE 802.11 standard was developed as an international standard for WLANs. Generally, the IEEE 802.11 standard was designed to present users with the same interface as an IEEE 802 wired LAN, while allowing data to be transported over a wireless medium.

Although WLANs provide users with increased mobility over wired LANs, the security of communications over a WLAN can vary for reasons that are not present in wired LANs. For instance, an unauthorized station can scan for signals transmitted over the WLAN to obtain information about the WLAN. This type of network intrusion is commonly known as a "war driving" activity.

SUMMARY

In one embodiment of the present invention, an unauthorized station in a wireless local area network is detected by receiving a probe request at a detector in the wireless local area network, where the probe request frame was transmitted over the wireless local area network by a station. The received probe request frame is analyzed at the detector to determine if the station that transmitted the probe request frame is an unauthorized station.

DESCRIPTION OF THE DRAWING FIGURES

The present invention can be best understood by reference to the following detailed description taken in conjunction with the accompanying drawing figures, in which like parts may be referred to by like numerals:

DETAILED DESCRIPTION

In order to provide a more thorough understanding of the present invention, the following description sets forth numerous specific details, such as specific configurations, parameters, examples, and the like. It should be recognized, however, that such description is not intended as a limitation on the scope of the present invention, but is intended to provide a better description of the exemplary embodiments.

Figure 1:
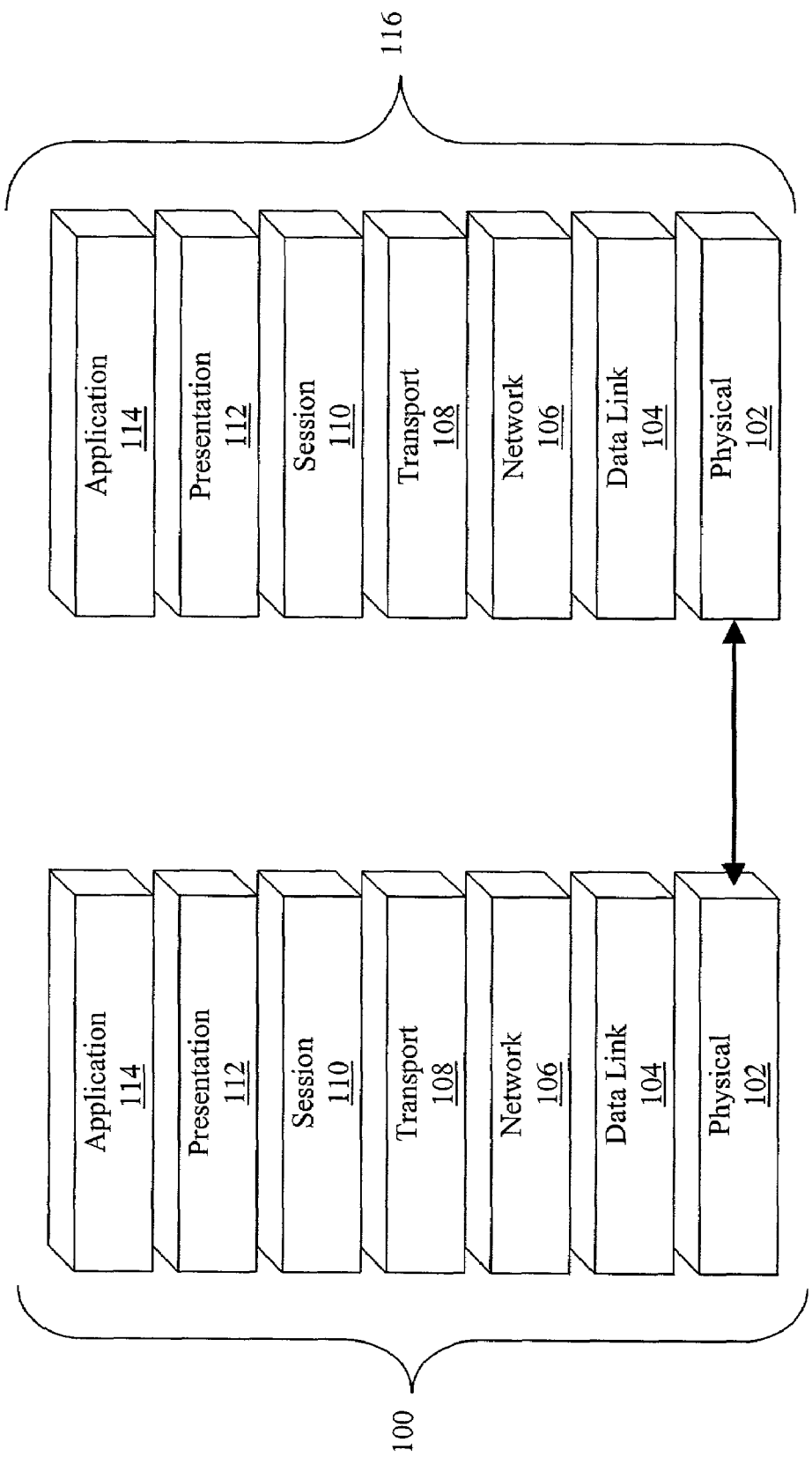
FIG. 1 shows an exemplary OSI seven layer model.

With reference to FIG. 1, an exemplary OSI seven layer model is shown, which represents an abstract model of a networking system divided into layers according to their respective functionalities. In particular, the seven layers include physical layer 102 corresponding to layer 1, data link layer 104 corresponding to layer 2, network layer 106 corresponding to layer 3, transport layer 108 corresponding to layer 4, session layer 110 corresponding to layer 5, presentation layer 112 corresponding to layer 6, and application layer 114 corresponding to layer 7. Each layer in the OSI model only interacts directly with the layer immediately above or below it, and different computers 100 and 116 can communicate directly with each other only at the physical layer 102. However, different computers 100 and 116 can effectively communicate at the same layer using common protocols. For example, in one exemplary embodiment, computer 100 can communicate with computer 116 at application layer 114 by propagating a frame from application layer 114 of computer 100 through each layer below it until the frame reaches physical layer 102. The frame can then be transmitted to physical layer 102 of computer 116 and propagated through each layer above physical layer 102 until the frame reaches application layer 114 of computer 116.

The IEEE 802.11 standard for wireless local area networks ("WLANs") operates at the data link layer 104, which corresponds to layer 2 of the OSI seven layer model, as described above. Because IEEE 802.11 operates at layer 2 of the OSI seven layer model, layers 3 and above can operate according to the same protocols used with IEEE 802 wired LANs. Furthermore, layers 3 and above can be unaware of the network actually transporting data at layers 2 and below. Accordingly, layers 3 and above can operate identically in the IEEE 802 wired LAN and the IEEE 802.11 WLAN. Furthermore, users can be presented with the same interface, regardless of whether a wired LAN or WLAN is used.

Figure 2:
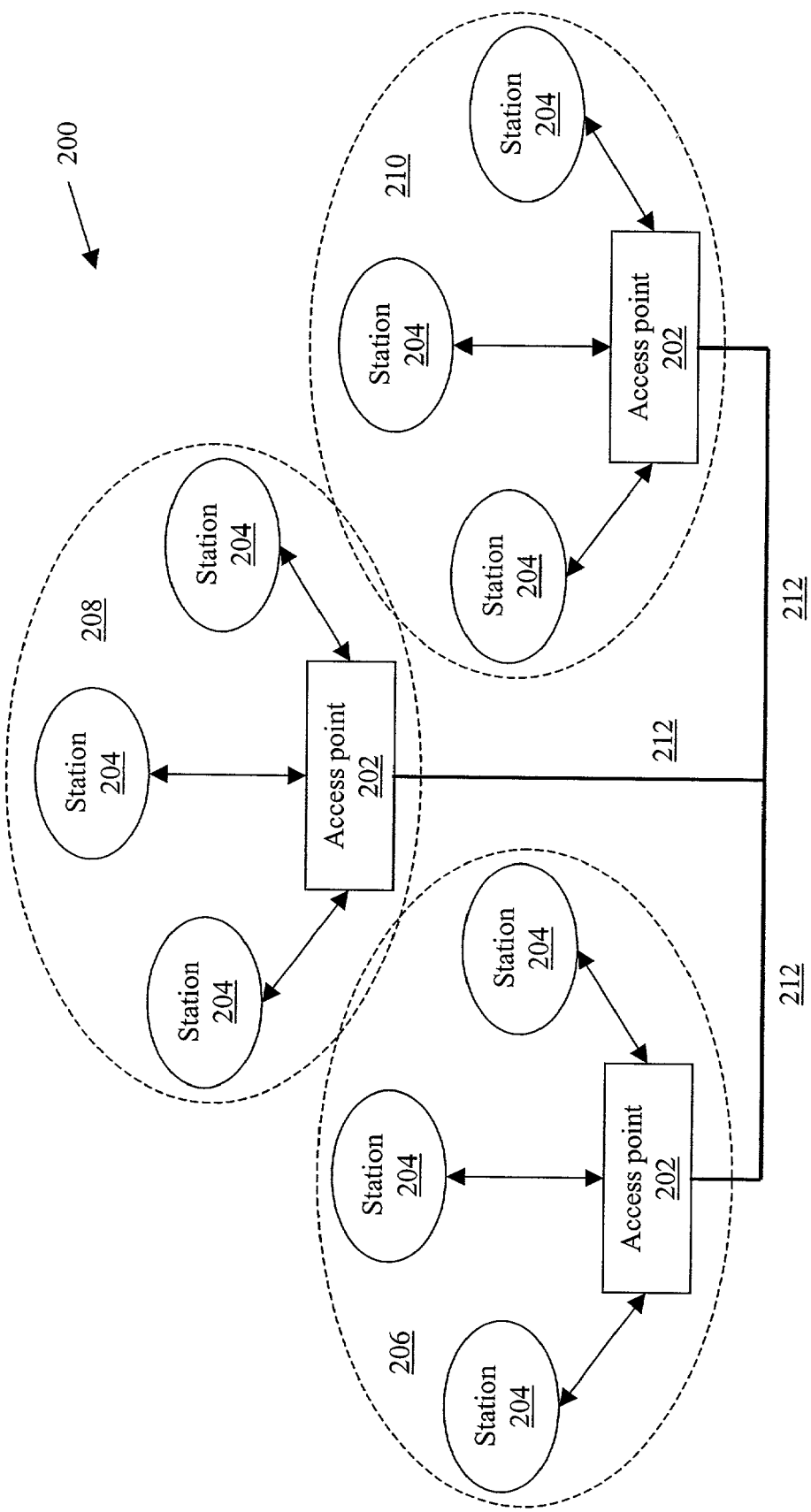
FIG. 2 shows an exemplary extended service set in a wireless local area network ("WLAN")

With reference to FIG. 2, an exemplary extended service set 200, which forms a WLAN according to the IEEE 802.11 standard, is depicted having basic service sets ("BSS") 206, 208, and 210. Each BSS can include an access point ("AP") 202 and stations 204. A station 204 is a component that can be used to connect to the WLAN, which can be mobile, portable, stationary, and the like, and can be referred to as the network adapter or network interface card. For instance, a station 204 can be a laptop computer, a personal digital assistant, and the like. In addition, a station 204 can support station services such as authentication, deauthentication, privacy, delivery of data, and the like.

Each station 204 can communicate directly with an AP 202 through an air link, such as by sending a radio or infrared signal between WLAN transmitters and receivers. Each AP 202 can support station services, as described above, and can additionally support distribution services, such as association, disassociation, distribution, integration, and the like. Accordingly, an AP 202 can communicate with stations 204 within its BSS 206, 208, and 210, and with other APs 202 through medium 212, called a distribution system, which forms the backbone of the WLAN. This distribution system 212 can include both wireless and wired connections.

Figure 3:
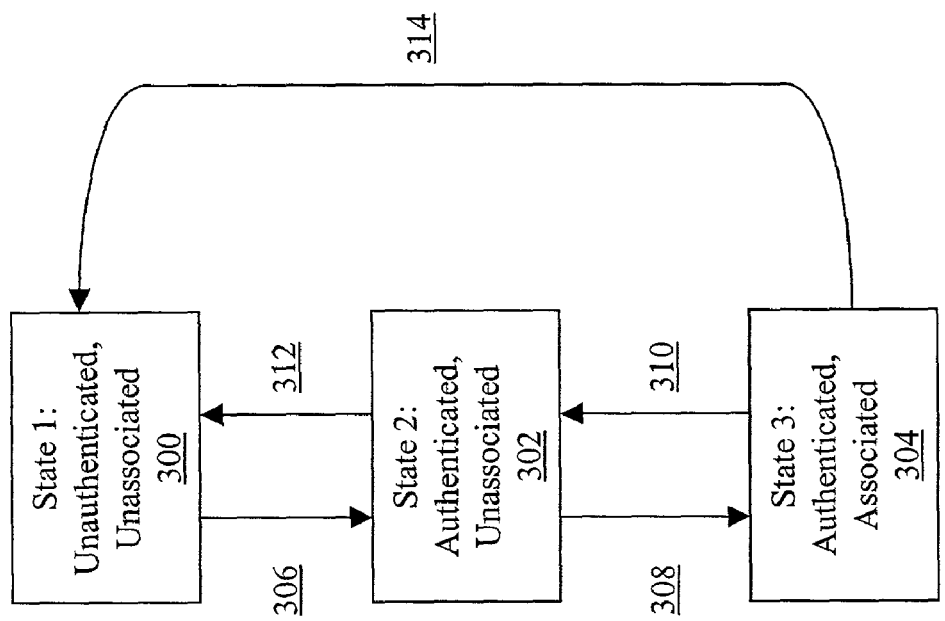
FIG. 3 is an exemplary flow diagram illustrating various states of stations in a WLAN.

With reference to FIGS. 2 and 3, under the current IEEE 802.11 standard, each station 204 must be authenticated to and associated with an AP 202 in order to become a part of a BSS 206, 208, or 210. Accordingly, with reference to FIG. 3, a station 204 begins in State 1 (300), where station 204 is unauthenticated to and unassociated with an AP 202. In State 1 (300), station 204 can only use a limited number of frame types, such as frame types that can allow station 204 to locate and authenticate to an AP 202, and the like.

If station 204 successfully authenticates 306 to an AP 202, then station 204 can be elevated to State 2 (302), where station 204 is authenticated to and unassociated with the AP 202. In State 2 (302), station 204 can use a limited number of frame types, such as frame types that can allow station 204 to associate with an AP 202, and the like.

If station 204 then successfully associates or reassociates 308 with AP 202, then station 204 can be elevated to State 3 (304), where station 204 is authenticated to and associated with AP 202. In State 3 (304), station 204 can use any frame types to communicate with AP 202 and other stations 204 in the WLAN. If station 204 receives a disassociation notification 310, then station 204 can be transitioned to State 2. Furthermore, if station 204 then receives deauthentication notification 312, then station 204 can be transitioned to State 1. Under the IEEE 802.11 standard, a station 204 can be authenticated to different APs 202 simultaneously, but can only be associated with one AP 202 at any time.

With reference again to FIG. 2, once a station 204 is authenticated to and associated with an AP 202, the station 204 can communicate with another station 204 in the WLAN. In particular, a station 204 can send a message having a source address, a basic service set identification address ("BSSID"), and a destination address, to its associated AP 202. The AP 202 can then distribute the message to the station 204 specified as the destination address in the message. This destination address can specify a station 204 in the same BSS 206, 208, or 210, or in another BSS 206, 208, or 210 that is linked to the AP 202 through distribution system 212.

Although FIG. 2 depicts an extended service set 200 having three BSSs 206, 208, and 210, each of which include three stations 204, it should be recognized that an extended service set 200 can include any number of BSSs 206, 208, and 210, which can include any number of stations 204.

Figure 4:
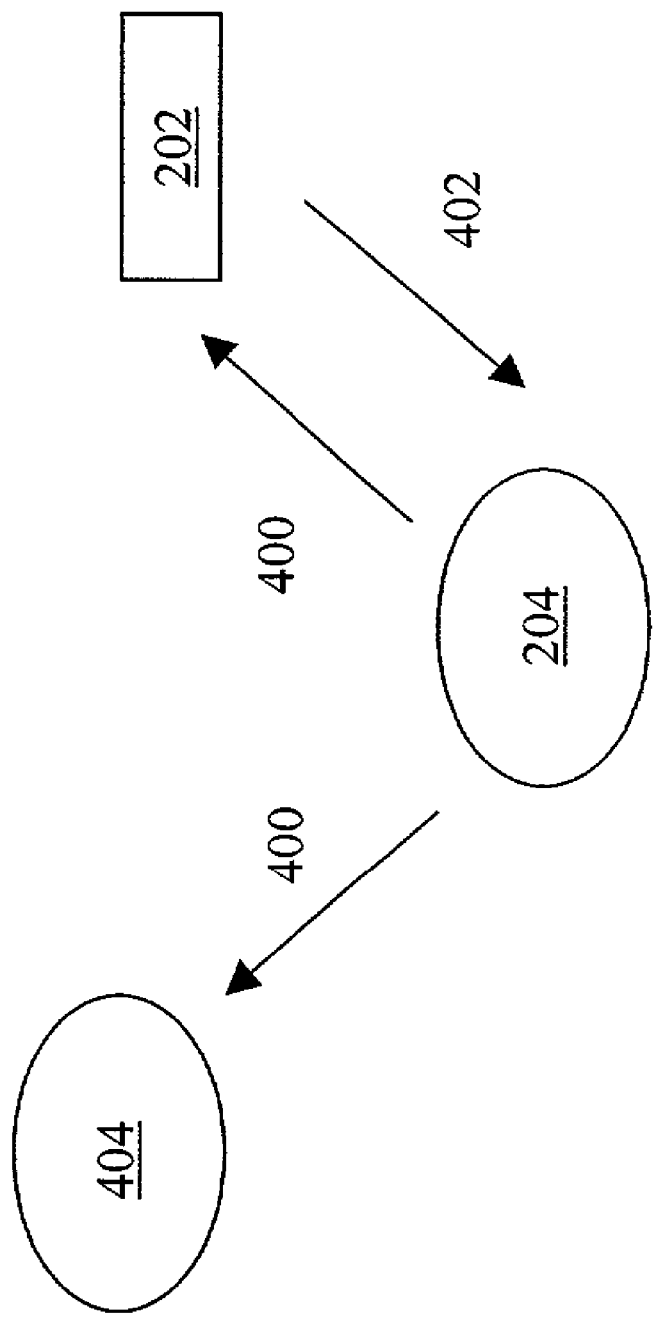
FIG. 4 shows an exemplary embodiment of a station sending a probe request frame.

Under the current IEEE 802.11 standard, before a station 204 can associate with an AP 202, station 204 first locates AP 202. With reference to FIG. 4, according to the current IEEE 802.11 standard, station 204 can transmit a probe request frame 400. Probe request frame 400 can include various element fields, such as service set identification address (SSID), supported rates, and the like. When AP 202 receives probe request frame 400, it transmits a probe response frame 402. Probe request frame 402 can include various element fields, such as timestamp, beacon interval, capability information, SSID, supported rate, channels, and the like.

If station 204 is an authorized station, meaning that it is authorized to obtain service from AP 202, it can use the information in probe response frame 402 to begin the process of autheticating or associating with AP 202. If station 204 is an unauthorized station and AP 202 is an unsecured access point, meaning that it does not have security measures to prevent unauthorized use, the unauthorized station can also associate with AP 202. Alternatively, if station 204 is an unauthorized station, it can simply store the information obtained from probe response frame 402. Additionally, the receipt of probe response frame 402 can inform an unauthorized station of the existence of AP 202, which may then be published or used in some other undesirable manner.

As noted earlier, obtaining information about AP 202 in this manner is commonly known as "war driving." One typical practice of war driving is to use a laptop or a similar portable device with a wireless network card and an antenna, and literally drive around to scan for WLAN signals.

With reference to FIG. 4, in one exemplary embodiment, a detector 404 is configured to determine whether station 204 is an unauthorized station. More specifically, detector 404 is configured to detect "war driving" activity from station 204.

In the present embodiment, detector 404 receives transmissions between AP 202 and station 204. Detector 404 then analyzes the transmissions from station 204 for "war driving" activity.

Figure 5:
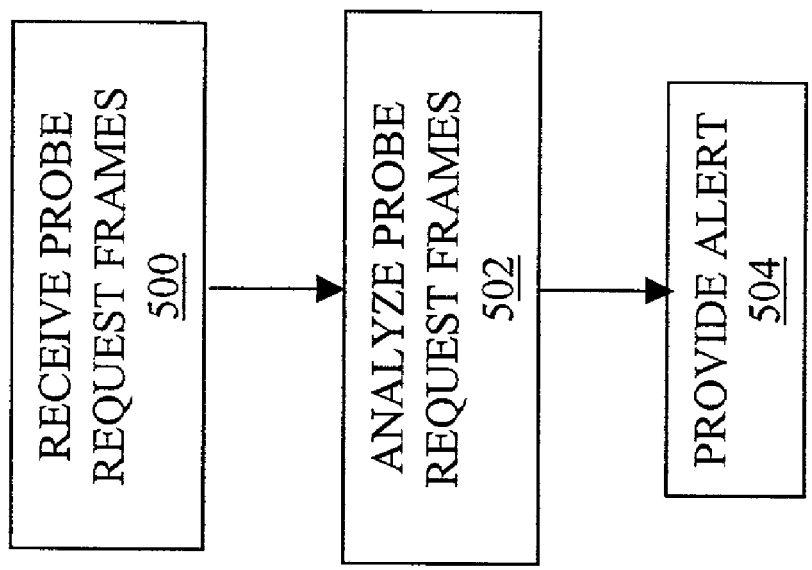
FIG. 5 shows an exemplary process of detecting an unauthorized station and/or "war driving" activities.

With reference to FIG. 5, an exemplary process for detecting an unauthorized station, and more particularly an unauthorized station engaging in "war driving" activity is depicted. With reference to FIG. 4, in step 500 (FIG. 5), detector 404 receives probe request frames 400 sent from station 204. In step 502 (FIG. 5), detector 404 then analyzes the probe request frames 400 for characteristics that are indicative of "war driving" activity. In step 504 (FIG. 5), if "war driving" activity is detected, detector 404 can provide an alert.

Figure 6:
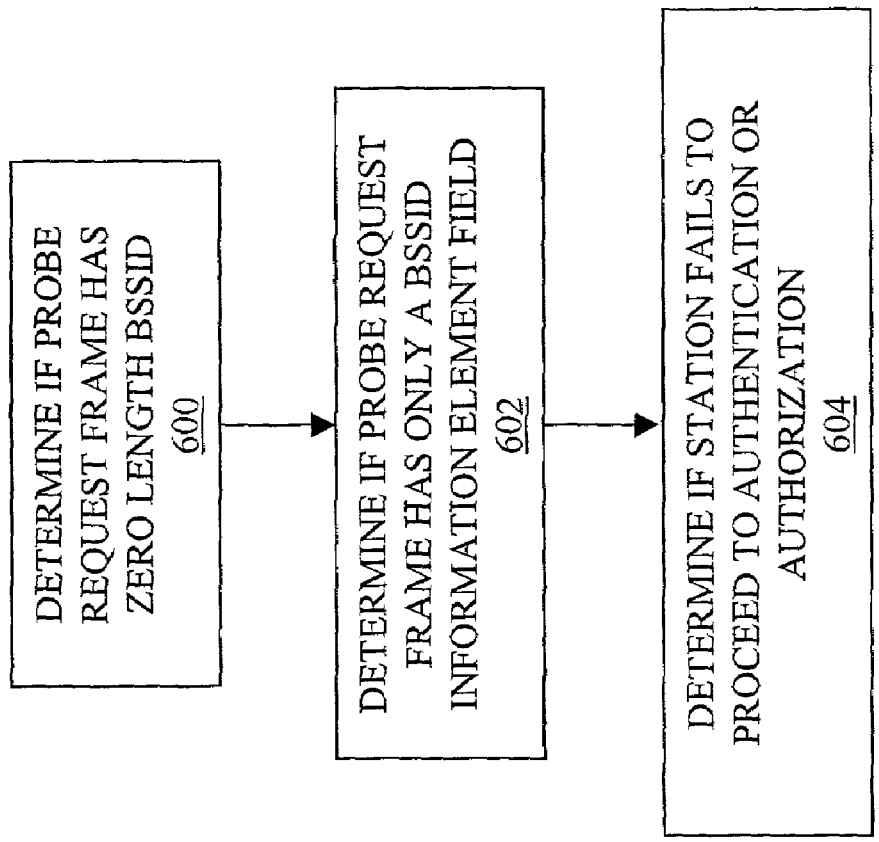
FIG. 6 shows another exemplary process of detecting an unauthorized station and/or "war driving activities.

With reference to FIG. 6, an exemplary process for detecting "war driving" activity is depicted. With reference to FIG. 4, in step 600 (FIG. 6), a probe request frame 400 is examined to determine if it has a zero length SSID. In step 602 (FIG. 6), probe request frame 400 is examined to determine if it has only a SSID information element field and no other fields. In step 604 (FIG. 6), after transmitting probe response frame 402, detector 404 determines if station 204 fails to proceed with authentication or association requests.

With reference to FIG. 6, in one embodiment, if the determinations in steps 600, 602, and 604 are affirmative, meaning that probe request frame 400 is determined to have a zero length SSID and only SSID information element field and station 204 (FIG. 4) fails to proceed with authentication or association requests, then station 204 is determined to be an unauthorized station and/or engaging in "war driving" activity.

With reference to FIG. 4, the exemplary processes described above for detecting an unauthorized station and/or "war driving" activity can be performed using software and/or hardware installed on detector 404. In one embodiment, detector 404 is a station in a wireless local area network. Additionally, the station can be mobile, portable, stationary, and the like. For instance, the station can be a laptop computer, a personal digital assistant, and the like. In addition, the station can be used by a user as a diagnostic tool, by an administrator as an administrative tool, and the like, to assess the quality of communications in the WLAN.

One advantage of the present embodiment includes allowing detector 404 to passively monitor the WLAN for unauthorized stations and/or "war driving" activities. By passively monitoring the WLAN in this manner, detector 404 can detect unauthorized stations and/or "war driving" activities in the WLAN without burdening AP 202, consuming bandwidth, or interfering with traffic over the WLAN.

Although the present invention has been described with respect to certain embodiments, examples, and applications, it will be apparent to those skilled in the art that various modifications and changes may be made without departing from the invention.

We claim:

1. A method of detecting an unauthorized station in a wireless local area network comprising:

receiving a frame at a detector in the wireless local area network, wherein the frame is transmitted over the wireless local area network by a station;

identifying the received frame as a probe request frame, which is sent by the station to an access point in the wireless local area network to associate with the access point, wherein the probe request frame has a service set identification address ("SSID");

analyzing the probe request frame received at the detector to determine if the station that transmitted the probe request frame is an unauthorized station that includes determining whether the length of the SSID is zero; and establishing that the station is the unauthorized station by at least determining that the length of the SSID is zero.

2. The method of claim 1 further comprising: receiving the probe request frame at an access point; and sending a probe response frame from the access point.

3. The method of claim 2, wherein analyzing the probe request frame comprises examining the probe request frame to determine if the probe request frame only has a SSID information element field; and determining if the station that transmitted the probe request frame fails to proceed with authentication or authorization in response to the probe response frame.

4. The method of claim 1, wherein analyzing the probe request frame comprises: determining if the station that transmitted the probe request frame is engaging in a war driver activity.

5. The method of claim 4, wherein determining if the station is engaging in a war driver activity comprises: determining if the probe request frame has the service set identification address ("SSID") with the length of zero; determining if the probe request frame only has a SSID information element field; and determining if the station that transmitted the probe request frame fails to proceed with authentication or authorization in response to a probe response frame sent from an access point.

6. The method of claim 1, wherein the probe request frame is received below a network layer in an OSI model.

7. The method of claim 1, wherein the probe request frame is sent and received according to the IEEE 802.11 standard.

8. The method of claim 1, wherein the detector is a station in the wireless local area network.

9. A method of detecting an unauthorized station in a wireless local area network engaging in "war driver" activity, the method comprising:

receiving a frame sent from a station at a detector;

identifying the received frame as a probe request frame, which is sent by the station to an access point in the wireless local area network to associate with the access point, wherein the probe request frame has a service set identification address ("SSID");

and analyzing the probe request frame at the detector to determine if the station that sent the probe request frame is an unauthorized station that includes determining whether the length of the SSID is zero; and establishing that the station is the unauthorized station by at least determining that the length of the SSID is zero.

10. The method of claim 9, wherein analyzing the probe request frame comprises determining if the probe request frame only has a SSID information element field; and determining if the station fails to proceed with authentication or authorization in response to a probe response frame sent from an access point.

11. The method of claim 10 further comprising: identifying the station that sent the probe request frame as an unauthorized station if the probe request frame has a SSID length of zero, the probe request frame only has a SSID information element frame, and the station fails to proceed with authentication or authorization in response to a probe response frame.

12. The method of claim 10 further comprising: identifying the station that sent the probe request frame as engaging in "war driver" activity if the probe request frame has a SSID length of zero, the probe request frame only has a SSID information element frame, and the station fails to proceed with authentication or authorization in response to a probe response frame.

13. A method of detecting an unauthorized station in a wireless local area network engaging in "war driver" activity, the method comprising:

receiving a frame sent by a station in the wireless local area network; receiving a probe response frame sent by an access point in the wireless local area network;

identifying the received frame as a probe request frame, which is sent by the station to an access point in the wireless local area network to associate with the access point, wherein the probe request frame has a service set identification address ("SSID");

receiving a probe response frame sent by the access point in the wireless local area network, wherein the probe request frame is sent in response to the probe request frame;

determining if:

the probe request frame includes a service set identification address ("SSID") with a length of zero, the probe request frame only has a SSID information element field, and the station that sent the probe request frame fails to proceed with authentication or authorization in response to the probe response frame and establishing that the station is the unauthorized station by determining that the SSID has the length of zero, the probe request frame only has the SSID information element field, and the station that sent the probe request frame fails to proceed with authentication or authorization in response to the probe response frame.

14. A system of detecting an unauthorized station in a wireless local area network comprising:

an access point configured to send a probe response frame in response to a probe request frame sent from a station; and a detector configured to:

receive a frame sent from the station, identify the received frame as a probe request frame, which is sent by the station to an access point in the wireless local area network to associate with the access point, wherein the probe request frame has a service set identification address ("SSID");

analyze the probe request frame to determine if the station is an unauthorized station that includes determining whether the length of the SSID is zero; wherein the detector is further configured to establish that the station is the unauthorized station by at least determining that the length of the SSID is zero.

15. The system of claim 14, wherein the detector is configured to: analyze the probe request frame to determine if the probe request frame only has a SSID information element field; and determine if the station fails to proceed with authentication or authorization in response to the probe response frame.

16. The system of claim 15, wherein the detector is configured to identify the station as an unauthorized station if the probe request frame has a SSID length of zero, the probe request frame only has a SSID information element frame, and the station fails to proceed with authentication or authorization in response to a probe response frame.

17. The system of claim 15, wherein the detector is configured to identify the station as engaging in a war driver activity if the probe request frame has a SSID length of zero, the probe request frame only has a SSID information element frame, and the station fails to proceed with authentication or authorization in response to a probe response frame.

18. The system of claim 14, wherein the detector is a station in the wireless local area network.

19. A computer-readable storage medium containing computer executable code to detect an unauthorized station in a wireless local area network by instruction the computer to operate as follows:
  receiving a frame sent from a station at a detector;
  identifying the received frame as a probe request frame, which is sent by the station to an access point in the wireless local area network to associate with the access point, wherein the probe request frame has a service set identification address ("SSID"); and
  analyzing the probe request frame at the detector to determine if the station is an unauthorized station that includes determining whether the length of the SSID is zero; and
  establishing that the station is the unauthorized station by at least determining that the length of the SSID is zero.

20. The computer-readable storage medium of claim 19, wherein analyzing the probe request frame comprises: determining if the probe request frame only has a SSID information element field; and determining if the station fails to proceed with authentication or authorization in response to a probe response frame sent from an access point.

21. The computer-readable storage medium of claim 20 further comprising: identifying the station as an unauthorized station if the probe request frame has a SSID length of zero, the probe request frame only has a SSID information element frame, and the station fails to proceed with authentication or authorization in response to a probe response frame.

22. The computer-readable storage medium of claim 20 further comprising: identifying the station as engaging in "war driver" activity if the probe request frame has a SSID length of zero, the probe request frame only has a SSID information element frame, and the station fails to proceed with authentication or authorization in response to a probe response frame.

* * * * *